(No Model.) 2 Sheets—Sheet 1.
L. R. OAKES.
LAMP BURNER.
No. 408,510. Patented Aug. 6, 1889.
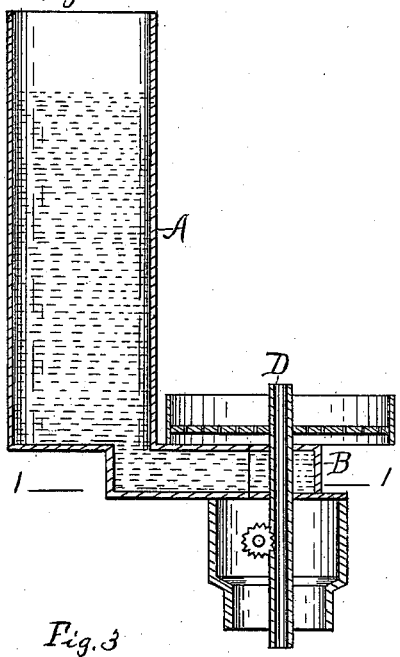
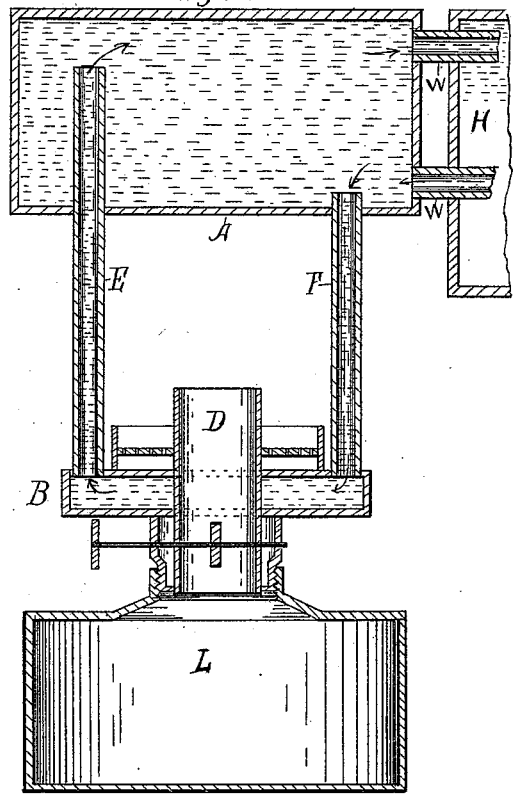
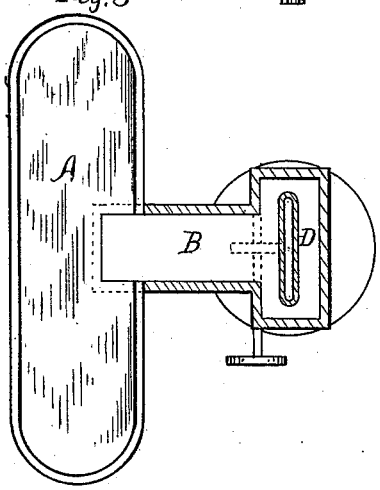
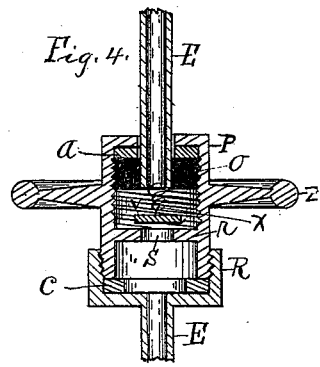
Witnesses
J. R. McKay
H. C. Hutchins
Inventor
Lucian R. Oakes By
Thos H. Hutchins his atty (No Model.) 2 Sheets—Sheet 2.
L. R. OAKES.
LAMP BURNER.
No. 408,510. Patented Aug. 6, 1889.
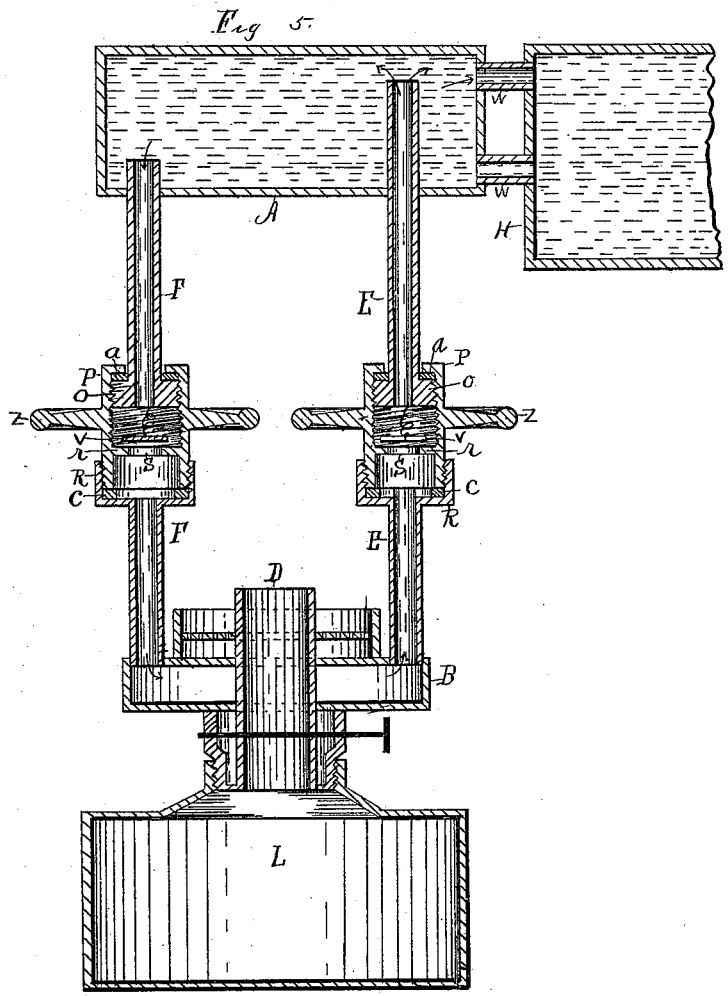

UNITED STATES PATENT OFFICE.

LUCIAN R. OAKES, OF VALPARAISO, INDIANA.

LAMP-BURNER.

SPECIFICATION forming part of Letters Patent No. 408,510, dated August 6, 1889.

Application filed March 21, 1889. Serial No. 304,182. (No model.)

*To all whom it may concern:*

Be it known that I, LUCIAN R. OAKES, a citizen of the United States of America, residing at Valparaiso, in the county of Porter and State of Indiana, have invented certain new and useful Improvements in Lamp-Burners, of which the following is a specification, reference being had therein to the accompanying drawings and the letters and figures of reference thereon, forming a part of this specification, in which—

Figures 1 and 2 are central vertical sections of the lamp-burner, the water-jacket for surrounding the wick-tube, and of the reservoirs for supplying the water-jacket. Fig. 3 is a horizontal section of Fig. 1 on line 1 and top plan of the water-reservoir. Fig. 4 is a vertical central section of a coupling intended to be used in the pipes E and F between the lamp and the water-reservoir above for attaching and detaching said lamp and reservoir; and Fig. 5 is a vertical section of the lamp-burner, the water-jacket for surrounding the wick-tube, the water-reservoir, and the tubes connecting said jacket and reservoir and their couplings for connecting and disconnecting the lamp from the reservoir.

This invention relates to certain improvements in lamps designed more particularly for burning kerosene-oil, and designed more for use in places where the lamp operates as a heater rather than for light, and where the lamp is designed to be kept burning a long time, as in incubators, oil-stoves, &c.; and the said improvement relates to means for keeping the wick-tube, wick, and oil cool immediately below the flame, so that the wick will not be charred down to the oil in the lamp, and so the flame will not go down the wick-tube into the lamp and cause the oil to explode. This is accomplished by means of placing a water-jacket around the wick-tube a short distance below its upper end.

Referring to the drawings, L is an ordinary lamp provided with a burner having the ordinary wick-tube D.

B is a closed receptacle arranged on the burner in such manner that the wick-tube D passes up through it, and so said receptacle forms a jacket around the wick-tube a short distance below its upper end. Said jacket is intended to contain water supplied thereto from an adjacent connected reservoir A, which reservoir may be in the form and connected as shown in Figs. 1 and 3, or as shown in Fig. 2, above the lamp, so the water in the reservoir may be heated.

Fig. 2 is designed to show the lamp connected with the water-reservoir of an incubator, a portion of the incubator being shown at H, and connected with reservoir A by means of the water-pipe W W. Said pipe is intended to be a continuous, return-pipe, through the upper member of which the water is designed to circulate out through the incubator and return through its lower member, as shown by the arrows. When the water-jacket B is thus connected with the reservoir above, one pipe E is made longer than the other pipe F, which will cause a flow or current of water to pass through the water-jacket B from the incubator, where it has been cooled, so that a current of cool water is thus caused to circulate around the wick-tube. The incubator in this case forms no part of this invention, and hence only so much is shown as to connect the lamp therewith to show one of its uses. For connecting and disconnecting the lamp with the reservoir above, the tubes E and F may be provided with a coupling such as is shown in Figs. 4 and 5. Fig. 5 shows the said coupling applied to each of said pipes, so by their use the lamp may be disconnected from the reservoir. To form such coupling, the upper members of said pipes are provided on their lower ends with the annular flanged head O, having its periphery screw-threaded to screw into the upper part of the female nut P, provided with a hand-flange Z for rotating it. The lower members of said pipes are provided on their upper ends with the cup R, screw-threaded on its inner periphery, so it can screw onto the lower end of nut P. *a* and *c* are annular packings for packing the parts of said coupling. Said nut P is provided with an annular flange *r* on its inner side near its central part, forming a valve-seat for valve V, which is suspended immediately above said valve-seat by means of a spiral spring X. When said nut P is turned up, it will cause said valve to descend and rest on said valve-seat, which will prevent the water in the reservoir above from being discharged when said pipe is uncoupled. This coupling is only shown as a means for connecting and disconnecting the lamp from the reservoir.

Having thus described my invention, what I claim as new, and desire to secure by Letters Patent, is as follows, to wit:

1. In a lamp, and in combination with its wick-tube D, the water-jacket B, arranged to inclose said wick-tube immediately below its upper end, so the water will be in contact with said tube to keep it cool, and a reservoir for holding water connected with said jacket, substantially as and for the purpose set forth.

2. In a lamp, in combination with its wick-tube D, the water-jacket B, arranged to inclose said wick-tube near its upper end, the tubes E and F, for connecting said jacket with reservoir A, the reservoir A, and the couplings in said tubes, consisting of the nut P, cup R, packings $a\ c$, valve V and seat $r$, and flange-head O, having its periphery screw-threaded, all arranged to operate substantially as and for the purpose set forth.

LUCIAN R. OAKES.

Witnesses:
THOS. H. HUTCHINS,
J. R. MCKAY.